UNITED STATES PATENT OFFICE.

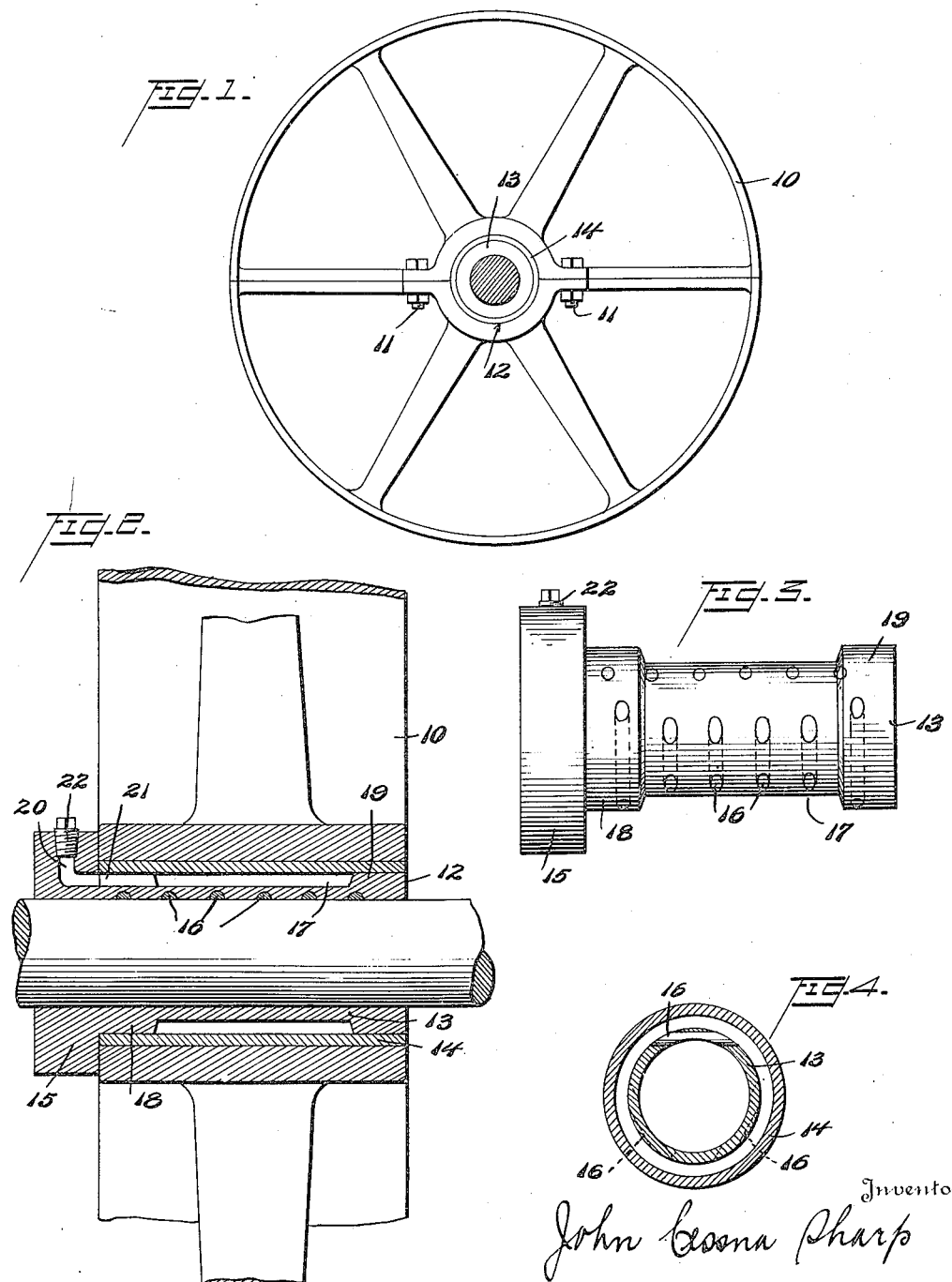

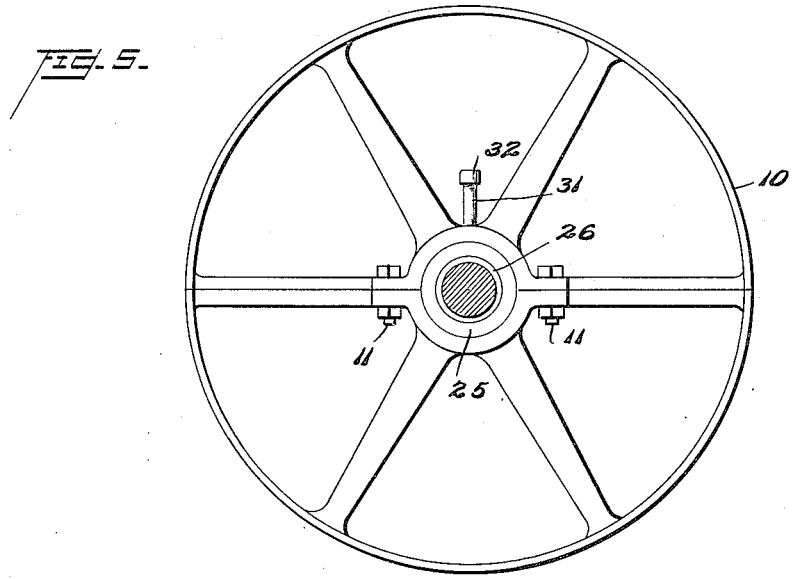
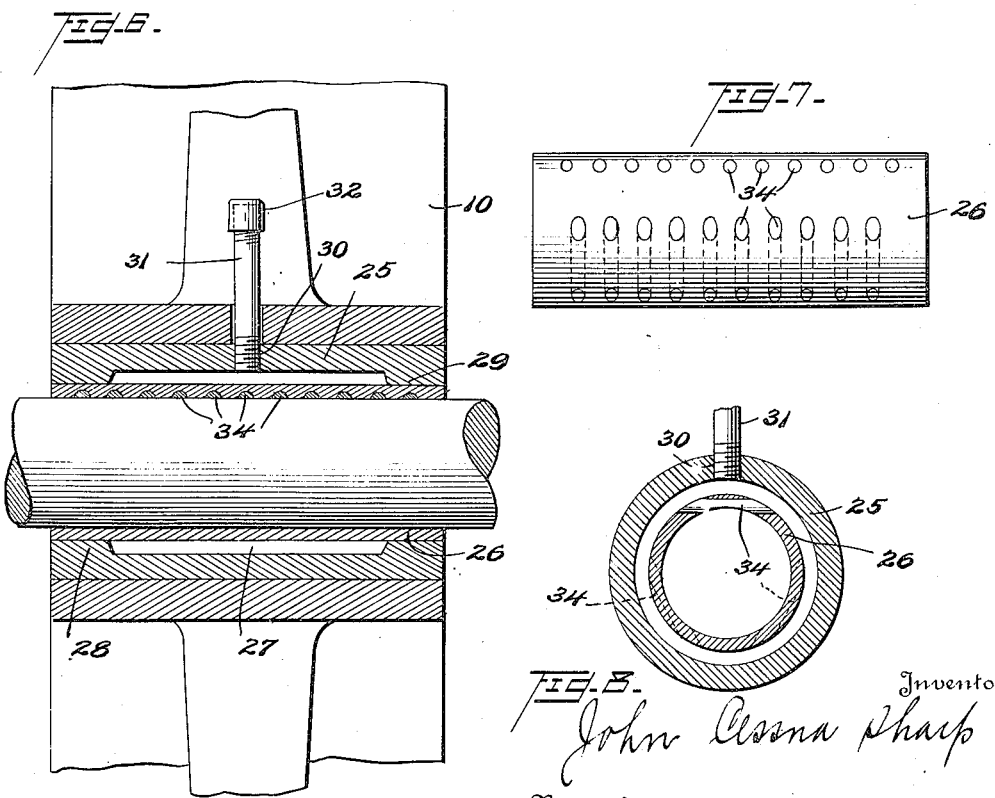

JOHN CESSNA SHARP, OF CHATTANOOGA, TENNESSEE, ASSIGNOR TO MOCCASIN BUSHING COMPANY, OF CHATTANOOGA, TENNESSEE, A COPARTNERSHIP CONSISTING OF JOHN CESSNA SHARP, JOHN S. POINDEXTER, AND WILLIAM F. WARD.

LUBRICATED PULLEY-BUSHING.

1,386,962. Specification of Letters Patent. Patented Aug. 9, 1921.

Application filed August 19, 1920. Serial No. 404,663.

*To all whom it may concern:*

Be it known that I, JOHN CESSNA SHARP, a citizen of the United States, residing at Chattanooga, in the county of Hamilton and State of Tennessee, have invented certain new and useful Improvements in Lubricated Pulley-Bushings, of which the following is a specification.

This invention relates to a lubricated pulley bushing, and particularly to a stout, durable and lubricant-containing unit bushing designed for sale as an article of manufacture and it finds its special adaptation for mounting loose pulleys upon shafts, whereby the standard forms of pulleys may be readily mounted upon the same and as easily removed therefrom.

The invention consists generally of a bushing or bearing unit composed of a plurality of hollow members correlated to form an oil chamber between them, means being provided for supplying oil to the said chamber and for filtering and economically feeding in a thin film the said oil to the bearing surface of the unit. The members are in the general form of stout metal sleeves or cylinders mounted one within the other with their ends in oil tight relationship and with a portion of their adjacent surfaces intermediate their ends spaced apart to provide an oil chamber between them. Means are provided for feeding lubricant economically and efficiently from the oil chamber to the bearing surface of the unit.

It has for its object the production of a lubricated bushing which is designed for marketing as a unit and used as a means for mounting pulleys and the like upon shafting. In such bushings it is necessary to provide a stout and approximately rigid construction, which will be durable in use and which will provide an oil chamber, effectually retaining the oil therein during transportation or storage, and efficiently filtering and feeding the oil to the bearing surface while in use. It has for a further object the provision of a lubricated unit bearing, which can be supplied with lubricant prior to its use as a bushing and whose parts are so correlated as to provide an oil tight chamber therein, from which the lubricant is fed in a thin film to the bearing surface, resulting in a decided economy of lubricant, and in a considerable saving of time usually required for refilling of bearings in general use. It has for a further object the provision of a lubricated bushing capable of use with standard forms of pulleys, and particularly with split pulleys, where the hub of the pulley cannot be used as an element of a bearing demanding a rigid mounting and an oil tight joint. Another object of the invention is the provision of a bushing unit whose parts when assembled form an inclosed lubricant chamber and are practically permanently attached to each other and will not be displaced by any conditions of usage, storage or transportation. A still further object is the provision of a lubricated pulley bushing which may be placed upon the market for replacement of less efficient bushings now in use, demanding little or no change in the construction of standard forms of pulleys with which it is used.

Other objects and advantages of the invention will hereinafter appear in the following description and the novel features thereof will be particularly pointed out in the appended claims.

While I have illustrated in the drawings certain forms of my invention, it will be understood that they are exemplary only, and that it is susceptible of various embodiments falling within the spirit and scope of the claims.

In the drawings, wherein like parts are indicated by like reference characters throughout the several figures thereof, Figure 1 is an elevation of a split pulley mounted upon a shaft with the bushing interposed, Fig. 2 is a view with parts in section showing one form of my bearing to which the pulley has been clamped, Fig. 3 is an elevation of the inner or oil feeding member of my bearing, Fig. 4 is a sectional view through the bearing unit, Fig. 5 is an elevation of a split pulley employing another form of my invention, Fig. 6 is a sectional view similar to Fig. 2 showing this modified form of my invention, Fig. 7 is a view of the inner member employed in this form, and Fig. 8 is a sectional view of the bearing unit showing the supply tube for lubricant.

The numeral 10 designates an ordinary form of split pulley, the sections of whose hub portions are secured together and clamped to the bearing unit by means of bolts 11.

The bearing unit is composed of stout, rigid, sleeve or cylindrical members, preferably of metal, with means for securing oil tight joints at their ends and an oil chamber between their adjacent surfaces. Any suitable means may be provided for securing these results, but I have shown and described a form in which ribs are provided upon the surface of one of the members, with which ribs the adjacent surface of the other member has oil tight contact, the oil chamber being provided intermediate these ribs and between the adjacent surfaces of the members.

The bearing unit 12 is shown in section in Fig. 2 and comprises two members 13 and 14. In this form of the invention, the inner member is shown of spool formation with a flange or hub 15 at one end thereof. It is provided with a bore of a diameter to secure a bearing fit with standard shafting, and with means to feed or filter lubricant from its outer surface to the bore to supply lubricant to the shaft. This feeding means has been shown in the form of a suitable number of transverse bores, which are disposed substantially tangentially of the inside diameter of the bushing member 13, which bores are filled with an insert or feeder 16 made of any suitable material, wood cut longitudinally of the grain being preferred. This particular feeding means is more fully disclosed in connection with the bushing member described and claimed in my Patent No. 1,113,143 dated October 6, 1914.

In the bushing or spool member 13 is formed the lubricant chamber of the bearing, said chamber being designated by the numeral 17 and is defined by the enlarged end portions or ribs 18 and 19. Adjacent the rib 18 is the flange or hub 15 in which is provided a duct 20, through which lubricant may be supplied to the chamber 17, a groove or channel as shown at 21 being formed in the said rib 18 to complete said duct.

The member 14 is in the form of a sleeve, whose inside diameter is substantially that of the ribs of the inner member, so that an oil tight fit is provided between said ribs and the corresponding inner surface of the sleeve when the parts are assembled as well as between the inner face of the flange and the end of said sleeve, these contacting surfaces being properly machined to produce this result.

In the form of the invention shown in Figs. 5 to 8, the recess or chamber for lubricant is formed in the outer member 25 of the bearing, while the inner member 26 has the form of a sleeve. The inner surface of the outer member in this instance has been so formed between its ends, as at 27, as to provide end ribs 28 and 29 and an intermediate oil chamber. Provision for supplying lubricant to the oil chamber is shown in the form of a screw threaded opening 30 in which is screwed a threaded tube 31, provided with a cup 32 of usual construction.

The split pulley hub is provided with an opening corresponding to that in the member 25, through which the tube projects as shown in Fig. 6. It will be noted that this tube constitutes a means for holding the pulley upon the bearing in its set position, and will prevent movement thereof upon the bearing in case the usual clamping means should become slightly loosened.

The inner member of bushing 26 is a cylinder provided with a suitable number of transverse bores, which are disposed therein substantially tangentially to the inside diameter thereof, which bores are filled with an insert or feeder 34, made of any suitable material, wood cut longitudinally of the grain being preferred. This member is the same as that described and claimed in my Patent No. 1,113,143 dated October 6, 1914.

The parts of the bearing are assembled by driving or pressing the outer hollow member upon the inner, so that there will be formed between the ribs of the one member and the adjacent surface of the other member joints which will effectually retain the lubricant within the annular oil chamber. In the form shown in Figs. 2 to 4 the outer member is pressed or driven into oil tight contact with the face of the flange 15 so that oil passing through the channel 21 will not be permitted to escape therefrom.

When thus assembled, the parts form a bushing unit of compact form, and lubricant may be introduced into the oil chamber between the members through the duct 20 and channel 21, and the plug 22 inserted in the outer end of said duct, thereby securely confining the oil in said chamber and duct. Or in the modified form of Figs. 6 to 8, it will be introduced through the tube 31, which will be capped as shown to confine the lubricant in said chamber and tube.

My invention provides a construction of bushing unit, which may be made up in the factory in quantities and in sizes to accommodate standard pulleys and shafting, and if found desirable the lubricant may be placed within the oil chamber at the time of shipment without danger of loss of lubricant during transportation or storage. The wooden inserts while effectually retaining the oil within the chamber of the unit will permit its proper feeding to the bearing surface when in use. By the use of stout hollow metal members a durable and rigid bushing is formed, and by pressing one of the members upon the other, a construction is provided in which the parts will be held together under all conditions of transportation, storage and use.

Having described my invention, what I claim as new and desire to secure by Letters Patent is:

1. As an article of manufacture, a bushing unit for mounting pulleys upon shafting comprising a plurality of hollow sleeve members mounted one upon the other and having their adjacent surfaces intermediate their ends spaced apart to provide a lubricant chamber, means for supplying lubricant to said chamber, and means for feeding said lubricant to the bearing surface of said unit comprising apertures in one of said members and fixed inserts filling said apertures.

2. As an article of manufacture, a bushing unit for mounting pulleys upon shafting comprising a plurality of hollow sleeve members mounted one upon the other and having their adjacent surfaces intermediate their ends spaced apart to provide a lubricant chamber, oil tight joints being formed at the ends of said members, and means extending from said oil chamber to the bearing surface of said unit for retaining said lubricant in said chamber during transportation or storage and for feeding said lubricant to the bearing surface when in use.

3. A bearing unit comprising a plurality of hollow sleeve members mounted one within the other and having oil tight joints formed at their ends and having their adjacent surfaces spaced from each other for a portion of their length intermediate their ends to form an oil chamber, means for supplying oil to said chamber, and means for feeding the oil to the bearing surface of said unit comprising apertures in one of said members and fixed inserts filling said apertures.

4. A bearing unit comprising a plurality of hollow sleeve members mounted one within the other, one of said members being of less thickness intermediate its ends than at its ends to produce with the adjacent surface of the other member an annular oil chamber between said members, means for supplying oil to said chamber, and means for feeding the oil to the bearing surface of said unit comprising apertures in one of said members and fixed inserts filling said apertures.

5. A bearing unit comprising a bushing member and an outer sleeve member tightly fitted thereon, one of said members having a portion intermediate its ends of less thickness than at its ends to produce with the adjacent surface of the other member an oil chamber between said members, oil tight joints provided at the ends of said members, means for supplying oil to said chamber, and means for feeding the oil to the bearing surface of said bushing comprising apertures in said bushing and fixed oil-filtering inserts filling in said apertures.

6. A bearing unit comprising a bushing having a portion intermediate its ends of less thickness than at its ends defining on its outer surface end ribs and an intermediate space or chamber and provided at one end with a flange, an outer sleeve member mounted upon said bushing and forming with the ribs thereof and with the face of said flange oil tight joints, means for supplying oil to said chamber, and means for feeding said oil to the bearing surface of said bushing.

7. A bearing unit comprising a bushing having a portion intermediate its ends of less thickness than its ends defining on its outer surface end ribs and an intermediate space or chamber, and provided at one end with a flange, an outer sleeve member mounted upon said bushing and forming with the ribs thereof and with the face of said flange oil tight joints, a duct in said flange and the rib adjacent thereto for supplying oil to said oil chamber, and means for feeding oil to the bearing surface of said bushing.

In testimony whereof I affix my signature.

JOHN CESSNA SHARP.